Aug. 29, 1967 D. A. ZELLER, JR., ET AL 3,339,192

MEANS TO COMPENSATE FOR DEVIATION BETWEEN RECORD AND PLAYBACK SPEED

Filed Sept. 5, 1963

INVENTORS
RAYMOND A. RUNYAN
DAVID A. ZELLER, JR.
BY
Kenyon & Kenyon
ATTORNEYS

3,339,192
MEANS TO COMPENSATE FOR DEVIATION BETWEEN RECORD AND PLAYBACK SPEED

David A. Zeller, Jr., Brookfield, and Raymond A. Runyan, Ridgefield, Conn., assignors to Data-Control Systems, Inc., Danbury, Conn., a corporation of Delaware Filed Sept. 5, 1963, Ser. No. 306,872
7 Claims. (Cl. 340—174.1)

ABSTRACT OF THE DISCLOSURE

The following specification discloses a pulse height adjustment technique of compensating for error in the frequency of a frequency modulated carrier, which error might be created when the modulated carrier is recorded on a magnetic tape by virtue of variations in the speed of the tape recorder. The pulse height adjustment technique illustrated operates on the demodulator output signal which is a pulse train having constant width pulses whose pulse repetition rate varies as a function of the instantaneous frequency of the carrier being demodulated. These constant width pulses are clamped to a nominally constant height so that, in effect, the spacing between the constant width pulses is the varying characteristic that carries information. The recording speed error compensation technique is one wherein the level at which the clamping means sets the height of the constant width pulses is varied as a function of a standard error signal derived from variations in a recorded reference signal on the tape.

This invention relates in general to a technique of compensating for certain types of errors in an information signal. And, more particularly, to a technique of compensating for the error introduced by recording and playback speed variations where information is recorded on a record such as magnetic tape.

Ideally, when information is to be recorded, the rate at which it is recorded and the rate at which it is played back should be held constant. Practically, the ideal is unattainable. The ideal may be approached by the use of very expensive equipment but the cost and weight of such equipment makes their usefulness very limited. Accordingly, techniques have been developed to compensate for the inevitable errors in the rate at which information is recorded as well as the rate at which information is played back.

The recording of a reference frequency simultaneous with the recording of the desired information establishes a reference against which tape or other recorder speed variations may be measured. An error signal may then be derived from a demodulator which is tuned to the reference frequency.

In certain prior art systems, this error signal is used to control a servo device which in turn affects the recorder speed in a fashion that compensates for the error. In more sophisticated prior art systems, this error signal is used to vary the center frequency of the demodulator into which the information signal is fed. The center frequency of this information signal demodulator is varied in such a direction and in such a magnitude as to tend to compensate for the error represented by the error signal.

One disadvantage of the technique where the error signal is used to vary the center frequency of the information signal demodulator is that such compensation is generally non-linear. Thus the prior art techniques do not completely compensate for error and the remaining error is greatest when tape speed error is greatest.

Accordingly, it is a purpose of this invention to provide a tape speed compensation technique which will be linear with the magnitude of tape speed error.

Another disadvantage of the prior art techniques resides in the fact that they require a modification of the information signal demodulator. In other words, the demodulator design must be modified so that the error signal can be fed into the demolulator to modify demodulator center frequency (or to modify any other demodulator characteristic that can result in tape speed error compensation). Since some end users do not require tape speed error compensation, the manufacturer is required to stock and build two demodulators.

Thus it is another purpose of this invention to provide a tape speed error compensation technique which will avoid the necessity for modifying the information signal demodulator.

It is a related purpose of this invention to provide a tape speed error technique which will operate on the uncorrected information signal after it has been demodulated.

It is a further purpose of this invention to achieve the above purposes by using the standard error signal which is derived from variations in a recorded reference signal.

This invention has its prime utility in connection with information which is recorded as a frequency modulated carrier (or subcarrier) wherein the demodulator provides a series of constant width pulses, which pulses carry the information by means of the variation in time between the pulses. In effect, this invention is adapted to operate on the output of a "discriminator" where a frequency modulated carrier is converted to a frequency modulated constant width pulse train. A pulse averaging technique is generally used to convert the pulse train to a varying "D.C." signal whose magnitude carries the information. This invention operates on an intermediate signal, specifically the pulse train put out by the demodulator.

In brief, these and other objects of this invention are achieved by a technique which involves clamping the pulse magnitude of the demodulator output. The use of a circuit to fix the magnitude (height) of the demodulator output pulse is not in itself new since a constant height pulse is necessary in a pulse averaging information retrieval system. However, what is new in this invention is that the clamping circuit provided operates on the pulse train after demodulation. Thus the tape speed compensator unit added is not functionally necessary for demodulation. In addition the novelty of this invention resides in part in the fact that the clamping circuit provided is so coupled to the error signal that the magnitude of the error signal affects the clamping voltage. In this fashion, speed variations in the tape will be reflected as changes in the error signal and these changes in the error signal will be reflected in the amplitude of the clamping voltage at which the pulse train output from the demodulator is clamped.

In the information retrieval systems where this invention is employed, the information is carried as a "frequency" modulated constant width pulse. Pulse averaging techniques are then employed to provide a D.C. output; the magnitude of that D.C. output reflecting the information retrieved. By the technique of this invention, the magnitude of that D.C. output is modified because the height of the constant width pulses is modified as a function of the error signal. Thus, in contrast to much of the prior art, the error signal does not modify the pulse width but rather modifies the pulse height.

Other objects and purposes of this invention will become apparent from a consideration of the following detailed description and the drawings, in which.

Figures 1, 2:
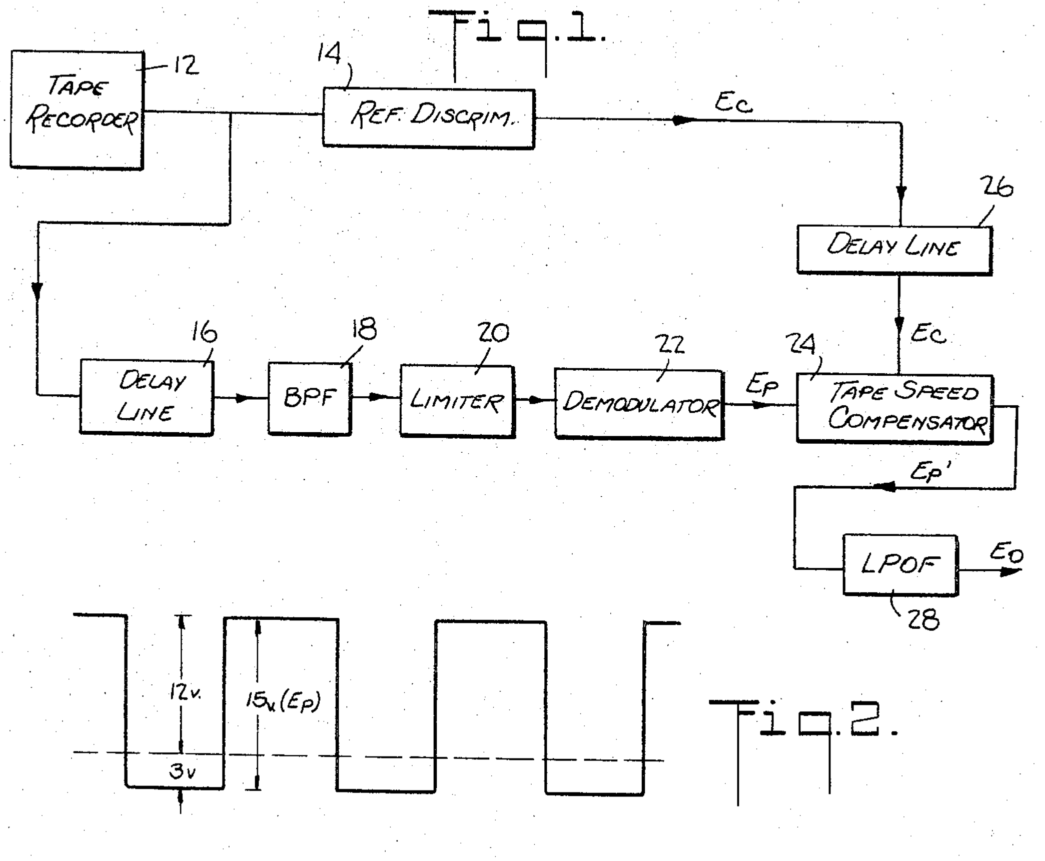
FIG. 1 is a block diagram of an information retrieval system incorporating this invention.
FIG. 2 is a graphical representation of the manner in which the system of this invention operates on the information signal demodulator output.

FIG. 1 broadly illustrates the error compensation system of this invention.

A recording medium such as a tape recorder 12 provides an output signal which consists of a reference signal and one or more frequency modulated subcarriers. A block diagram for only one subcarrier is shown since, if there be more than one subcarrier, the arrangement illustrated in FIG. 1 will simply be duplicated for each subcarrier.

Accordingly, for the purpose of describing this invention, we can consider that the output from the tape recorder 12 is a mixture of a reference signal and a frequency modulated subcarrier signal. The reference signal will generally be at a frequency sufficiently different than any of the subcarrier frequencies so that it may readily be separated from the subcarriers.

The manner of converting the reference signal into a control signal $E_c$ is well known in this art and the circuitry for achieving the control signal $E_c$ is broadly indicated by the box labeled a reference discriminator 14. The reference signal is nothing more than a fixed frequency, which may be generated by an oscillator, that is recorded on the tape and played back by the tape recorder 12. The reference discriminator 14 operates on that oscillator produced signal which, because of recorder speed variations, is frequency modulated as a function of variations in the speed of the tape recorder 12 during recording and during playback. The reference discriminator 14 filters out everything except this frequency modulated reference signal and then compares the frequency modulated reference signal with an unmodulated reference signal of the same center frequency to produce a D.C. output control signal $E_c$. This control signal $E_c$ is a D.C. compared to the oscillator produced reference signal but it is a D.C. that varies in magnitude as a function of the variations in tape speed during recording and playback. This control signal $E_c$ is then used to modify the pulse height of the "frequency" modulated pulse train $E_p$ in a fashion that is described further on, herein.

The information signal is processed in a standard manner up to the point where it emerges from the demodulator 22 as a frequency modulated pulse train $E_p$. More particularly, the tape recorder 12 output is fed through a delay line 16, which is a broad band pass delay line designed to match the delay in the reference discriminator 14. The delay line 16 output is thus the full set of channels (subcarriers) provided by the recorder 12. A separate band pass filter BPF 18 is provided for each channel and has a band pass commensurate with that required by the particular channel. Thus the BPF 18 provides a signal that is substantially uncontaminated by other subcarriers.

A limiter circuit 20 converts the sinusoidal signal into a substantially square wave signal.

The demodulator circuit 22, in this embodiment, is substantially a pulse generator such as a monostable multivibrator which produces a pulse train preferably having a 50% duty cycle. The demodulator 22, in response to each pulse in the square wave train out of the limiter 20, provides two constant width output pulses (one at each axis crossing). In this fashion, the demodulator 22 output is an information signal $E_p$ which is a train of constant width pulses. The spacing between the constant width pulses is a function of the rate at which the monostable multivibrator (demodulator 22) is triggered and that is a function of the frequency modulated input signal. This information signal train of pulses will ultimately be converted by a pulse averaging circuit (the low pass output filter 28) into a variable D.C. signal $E_o$, the magnitude of which represents the information being carried. This varying D.C. information output $E_o$ is called D.C. herein because its magnitude changes with time at a very much lower rate than the subcarrier frequency.

This demodulator 22 output $E_p$ will contain not only the information desired to be retrieved but also an error caused by changes in the speed of the tape recorder 12 during recording and playback. The prior art technique of correcting the speed variation changes was to modify the operation of the demodulator 22 in such a fashion as to compensate for these errors. For example, the pulse width output of a monostable multivibrator could be varied to achieve the appropriate compensation. However, in this invention, a tape speed compensator circuit 24 is provided which operates on the uncompensated demodulator 22 output $E_p$ so as to provide a corrected signal $E_p'$. In broad terms, this is achieved by a tape speed compensator circuit 24 which modifies the height of the pulses normally fed to the LPOF 28.

The operation of the tape speed compensator unit 24 is graphically illustrated in FIG. 2. As may be seen in FIG. 2, a train of constant height pulses $E_p$ represents the output from the demodulator 22 (an output that is normally fed directly into the LPOF 28). In the embodiment described herein these pulses are shown as having a magnitude of 15 volts. When there is no error signal $E_c$ at all, and thus when the recording and playback speeds are unvarying and accurately on bogie, the tape speed compensator circuit 24 is designed to clamp the information pulses $E_p$ by the amount shown by the dotted line, in FIG. 2. In this embodiment, the magnitude of the no-error signal clamp is 3 volts, so that a normally 12 volt peak to peak pulse train $E_p'$ is developed from the 15 volt peak to peak pulse train $E_p$.

It should be noted that it is not necessary to incorporate the tape speed compensator 24 unit in order to obtain proper operation of the demodulator 22. The 15 volt peak to peak pulse train $E_p$ output from the demodulator 22 can be fed directly to the LPOF 28 and the overall system would continue to operate except for the fact that there would be no compensation for variations in tape speed. The removal of a tape speed compensator unit 24 would require the re-zeroing of the demodulator 22 and the resetting of its gain but those operations are necessary in any case. The ability to remove the tape speed compensator unit 24 and leave an operable system behind results from the fact that the demodulator 22 output $E_p$ is directly coupled to the LPOF 28 and the compensator unit 24 operates to do no more than alter the pulse amplitude.

When recording and/or playback speeds deviate from bogie, an error signal $E_c$ is developed which causes the magnitude of the clamping voltage to vary above and below the no-error 12 volt clamp. In this fashion, the height of the pulses $E_p'$ at the output of the tape speed compensator unit 24 are made a partial function of the error signal.

By means of this technique, compensation is made for changes in tape speed, which changes would otherwise appear as data in the output. It must be remembered that ultimate data is obtained by a pulse averaging technique. Thus a tape speed error which effects the spacing between pulses can be compensated for by making a synchronized compensatory change in pulse amplitude. By thus increasing or decreasing (modulating) the voltage level at which the pulses in the pulse train $E_p$ are clamped, the ultimate "D.C." level that is provided after pulse averaging is modified to an extent and in a direction which compensates in a linear manner for the error introduced by variations in tape recorder speed.

The voltage level at which the tape speed compensator circuit 24 clamps the pulses in the pulse train $E_p$ is modified by the magnitude of the control signal $E_c$ which is supplied by the reference discriminator. This control signal $E_c$ is passed through a delay line 26 so that it will be delayed by an amount comparable with the envelope delay imposed by the band pass filter 18 and thus will be synchronized to the information signal $E_p$.

Figure 3:
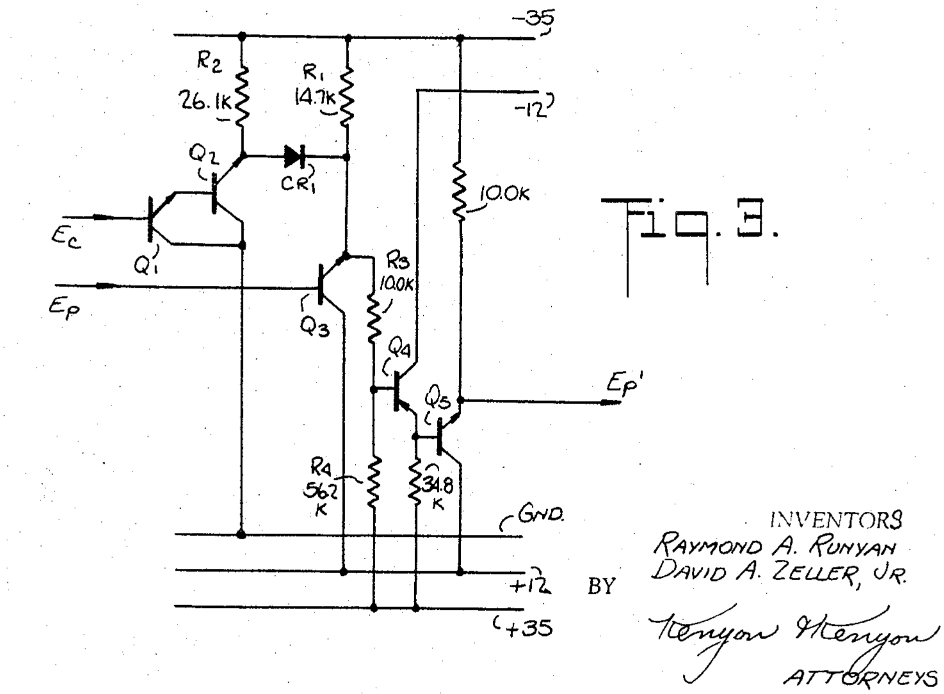
FIG. 3 is a circuit diagram of a tape speed compensator circuit which may be employed in the system illustrated in FIG. 1.

FIG. 3 is a schematic drawing which illustrates one embodiment of the tape speed compensator 24 unit of this invention. The error signal $E_c$ is fed from the delay line 26 to the base of the transistor Q1. The transistors Q1 and Q2 operate as a power amplifier to provide an appropriate output at the emitter of Q2. The circuit parameters are so selected that even when there is no error signal $E_c$, the transistors Q1 and Q2 are "on." Thus a voltage is at all times developed across R2 to provide a predetermined voltage at the emitter of Q2 which is also one side of the diode CR1. When there is no error signal $E_c$, this embodiment is designed to provide a 12 volt level at the Q2 emitter side of CR1. As will be seen from the description below, this voltage represents the clamping voltage shown in FIG. 2.

The other input to this tape speed compensator unit 24 is the output $E_p$ of the demodulator 22 which is normally fed into the LPOF 28. This pulse train $E_p$ is fed to the base of the transistor Q3. In the illustrated embodiment, the demodulator 22 is designed to provide a pulse train $E_p$ in which the pulses have a 15 volt magnitude. The transistor Q3 is designed as an emitter follower so that the emitter output of Q3 would normally follow the input to its base. However, in this circuit, as the emitter of Q3 becomes more negative than the emitter of Q2 the diode CR1 closes and holds the emitter of Q3 to the voltage at the emitter of Q2. In this fashion, the 15 volt negative peak pulse which is supplied by the demodulator 22 is clamped at 12 volts by operation of the diode CR1.

As the error voltage $E_c$ is applied to the base of Q1, it will modify the "normal" 12 volt level developed at the Q2 emitter side of CR1. In this fashion, the polarity and magnitude of the error signal $E_c$ will modify the clamping voltage above and below the errorless 12 volt level to provide a pulse amplitude at the emitter of Q3 which is a partial function of the error signal $E_c$ developed. In order to obtain linear operation it is the constant width pulse height that must be modified.

The resistors R3 and R4 operate as a voltage divider, which together with the amplifiers Q4 and Q5 are designed, in this embodiment, to provide a direct coupled 10 volt peak to peak square wave at the emitter output at Q5. This output is then fed into the low pass output filter 28. As mentioned above, the LPOF 28 serves to filter out the subcarrier and to provide the "D.C." output $E_o$ which by its magnitude supplies the desired information.

It should be noted that in the FIG. 3 circuit, when the input to the base of Q1 is grounded, the emitter of Q3 is clamped at 12 volts. This "no-error signal" clamp is required so that the clamping voltage can be modulated above and below the no-error 12 volt clamp as the error signal $E_c$ goes above and below ground. Of course, it is not critical that ground be selected as the no-error signal point. What is important is that there be a no-error signal clamping voltage that is less than the $E_p$ peak to peak voltage so that there can be compensations for tape speed variations above and below the exact speeds.

In this application, and particularly in the claims, the language that is used shall be understood to have certain conventional meaning as described below.

The heart of this invention involves the particular technique for treating the demodulator 22 output so as to compensate for variations in record speed. The practical applications of the invention will frequently be to situations where the record provides a number of separate information signals carried on separate subcarriers. As far as the application of this invention is concerned it is immaterial as to whether or not the information is carried on a main carrier or on a subcarrier.

The description of the invention involves an embodiment including a magnetic tape recording machine 12. It should be understood however that this invention has application to other medium for recording information such as a disc or a magnetic drum. Accordingly, the term "record" is used herein, particularly in the claims, to designate any medium in which information may be recorded.

The information that is recorded will generally be recorded as a frequency modulated signal. The demodulator 22 operates on this frequency modulated signal to produce a pulse train $E_p$, each pulse of which represents one-half cycle of the sinusoidal frequency modulated signal. This pulse train $E_p$ carries information by means of variations in its pulse repetition rate. Thus this pulse train $E_p$ is a pulse repetition rate modulated pulse train. However, for brevity of expression, the pulse train $E_p$ may be referred to herein as a frequency modulated pulse train.

The output signal $E_o$ is referred to herein as a D.C. signal. It is D.C. only by comparison with the frequency of the carrier (or subcarrier) from which it is derived. Actually, this D.C. output $E_o$ has a varying voltage, which varies at the information signal rate and thereby carries the desired information.

This invention is particularly adapted to a frequency modulated signal which is converted into a pulse train having constant width pulses and which carries the information by means of variations in the pulse repetition rate. When the invention is applied to such a system, the invention will provide tape speed correction that is linear with tape speed error and in that fashion provide errorless output. However, since a major virtue of this invention is its ability to be added to an already designed demodulator unit, the invention in its broadest form will have applicability to other forms of modulations such as duty cycle modulation (in which the pulse width varies). Accordingly, the invention is applicable to any recorded time modulated carrier or subcarrier.

What is claimed is:

1. In a system for converting a constant width pulse train information signal to a varying D.C. information signal, an error signal being derived in said system to represent modulation error, the improvement comprising:
   a switch,
   means for applying a predetermined voltage to a first side of said switch, the absolute magnitude of said predetermined voltage being less than the peak to peak voltage of the pulses in said pulse train,
   means controlled by said error signal to vary the magnitude of said predetermined voltage as a function of the magnitude of said error signal, and
   means for coupling said pulse train to the second side of said switch to provide a modified pulse train at said second side of said switch, whereby the pulses of said modified pulse train have an amplitude that is determined by said error signal.

2. In a system for converting a frequency modulated pulse train information signal to a varying D.C. information signal, wherein said D.C. signal is obtained by pulse average processing of said pulse train, wherein the pulses constituting said pulse train have a constant width, and wherein an error signal is derived representing modulation error, the improvement comprising:
   a diode,
   means for applying a predetermined voltage to a first side of said diode, the absolute magnitude of said predetermined voltage being less than the peak to peak voltage of said pulses in said pulse train,
   means controlled by said error signal to vary the magnitude of said predetermined voltage as a function of the magnitude of said error signal, and
   means for coupling said pulse train to the second side of said diode to provide a modified constant width pulse train at said second side of said diode, whereby the constant width pulses of said modified pulse train have an amplitude that is determined by said error signal.

3. A system for correcting a recorded information sig nal to compensate for errors introduced by recording speed variations comprising:

means for deriving an error signal representing said recording speed variations, means for converting said recorded information signal to provide a constant width pulse train information signal having a varying pulse repetition rate, a diode, means for applying a predetermined voltage to a first side of said diode, the absolute magnitude of said predetermined voltage being less than the peak to peak voltage of the pulses in said pulse train, means controlled by said error signal to vary the magnitude of said predetermined voltage as a function of said recording speed variations, and means for coupling said pulse train to the second side of said diode to provide a modified pulse train at said second side of said diode, whereby the pulses of said modified pulse train have an amplitude that is determined by said error signal and thus a function of recording speed variations.

4. A system for correcting a recorded information signal to compensate for errors introduced by recording speed variations comprising:

means for deriving an error signal having a magnitude that is a function of said recording speed variations, means for converting said recorded information signal to a time modulated pulse train, the pulses of said train having a constant width, a diode, means for applying a predetermined voltage to a first side of said diode, the absolute magnitude of said predetermined voltage being less than the peak to peak voltage of said pulses in said pulse train, means controlled by said error signal to vary the magnitude of said predetermined voltage as a function of the magnitude of said error signal, and means for coupling said pulse train to the second side of said diode to provide a modified pulse train at said second side of said diode, whereby the constant width pulses of said modified pulse train have an amplitude that is determined by said error signal.

5. A system for correcting the pulse train information signal output of a frequency demodulator to correct for errors introduced by recording speed variations, wherein said pulse train is a train of constant width pulses having a period between pulses that is determined by the instantaneous frequency of the carrier signal being demodulated, comprising:

means for deriving an error signal having a magnitude that is a function of said recording speed variations, pulse height adjustment circuit means to clamp the height of the constant width portions of said train of constant width pulses at a predetermined nominally constant amplitude, and compensator circuit means responsive to said error signal and coupled to said pulse height adjustment circuit means to modify, as a function of the magnitude of said error signal, the amplitude at which said pulse height adjustment circuit means clamps said constant width pulses, whereby an output information signal derived from the average value of the constant width pulses will be corrected to eliminate the effect of recording speed variations.

6. The error compensation improvement of claim 5 wherein said pulse height adjustment circuit means is coupled to the pulse generating circuitry within the frequency demodulator to determine the height of the pulses generated by said demodulator.

7. The error improvement system of claim 5 wherein the constant width pulse train output of the frequency demodulator is coupled to the input of said pulse height adjustment circuit means.

References Cited

UNITED STATES PATENTS

| | | | |
|---|---|---|---|
| 2,807,797 | 9/1957 | Shoemaker | 340—174.1 |
| 2,892,022 | 6/1959 | Houghton | 340—174.1 |
| 2,975,240 | 3/1961 | Berry | 179—100.2 |

BERNARD KONICK, *Primary Examiner.*

V. P. CANNEY, *Assistant Examiner.*